United States Patent
Fenichel et al.

(10) Patent No.: US 12,333,538 B2
(45) Date of Patent: *Jun. 17, 2025

(54) SYSTEMS AND METHODS FOR USING PROXY NUMBER TOKENS WITH CONFIGURABLE RELATIONSHIP DATA BINDINGS

(71) Applicant: Capital One Services, LLC, McLean, VA (US)

(72) Inventors: Allison Fenichel, Brooklyn, NY (US); Amanda Sneider, New York, NY (US); Niyati Shah, Pleasanton, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,511

(22) Filed: Mar. 22, 2024

(65) Prior Publication Data

US 2024/0273531 A1 Aug. 15, 2024

Related U.S. Application Data

(63) Continuation of application No. 17/235,000, filed on Apr. 20, 2021, now Pat. No. 11,966,921.

(51) Int. Cl.
*G06Q 20/40* (2012.01)
*H04L 9/32* (2006.01)
*G06N 20/00* (2019.01)

(52) U.S. Cl.
CPC ......... *G06Q 20/401* (2013.01); *G06Q 20/405* (2013.01); *H04L 9/3213* (2013.01); *G06N 20/00* (2019.01); *G06Q 2220/00* (2013.01)

(58) Field of Classification Search
CPC ............... G06Q 20/401; G06Q 20/405; G06Q 2220/00; H04L 9/3213; G06N 20/00
USPC .......................................................... 705/66
See application file for complete search history.

(56) References Cited

U.S. PATENT DOCUMENTS

| | | | |
|---|---|---|---|
| 10,706,414 B1* | 7/2020 | Lieberman | G06Q 20/4016 |
| 2020/0005192 A1* | 1/2020 | Kumar | G06N 5/025 |
| 2021/0217014 A1* | 7/2021 | Shetty | G06Q 20/4014 |
| 2021/0390552 A1* | 12/2021 | Bari | G06Q 20/405 |
| 2023/0196358 A1* | 6/2023 | Cohn | G06Q 20/401 |
| | | | 705/44 |

* cited by examiner

*Primary Examiner* — Courtney P Jones
(74) *Attorney, Agent, or Firm* — Foley & Lardner LLP (57) ABSTRACT

Disclosed herein are systems and methods for a system for authorizing proxy number token requests. The system may comprise a memory storing instructions and at least one processor configured to execute instructions to perform operations. These operations may comprise receiving a first request to use a proxy number token to complete a first action associated with a first entity; authorizing the first request; receiving a second request to use the proxy number token to complete a second action associated with a second entity; determining a modifiable relationship data binding associated with the first and second entities, the modifiable relationship data binding comprising multiple parameters; determining that the second request satisfies the parameters; and authorizing the second request based on a determination that the second request satisfies the parameters.

20 Claims, 4 Drawing Sheets

SYSTEMS AND METHODS FOR USING PROXY NUMBER TOKENS WITH CONFIGURABLE RELATIONSHIP DATA BINDINGS

CROSS-REFERENCE TO RELATED APPLICATION(S)

This application is a continuation of U.S. patent application Ser. No. 17/235,000, filed Apr. 20, 2021. The content of the foregoing application is incorporated herein in its entirety by reference.

TECHNICAL FIELD

Exemplary embodiments generally relate to systems and methods for authorizing proxy number token requests. For example, disclosed techniques may include receiving a request to use a proxy number token and authorizing a request using a relationship data binding. Other techniques may include modifying relationship data bindings.

BACKGROUND

Conventional transaction data systems typically rely on information received from a user device to authorize a transaction. Often, a system device may provide a user with a unique token associated with a financial account for use in an electronic transaction initiated by the user device. In many cases, these tokens may be created for a particular merchant or other entity, even though an electronic transaction may involve multiple electronic sub-transactions, all of which may not directly relate to the particular merchant or other entity. For example, a user device may attempt to make an electronic transaction with an airline, together with an electronic transaction for flight insurance, at a website or application of the airline. Current systems are limited in their ability to effectively authorize two electronic transactions for two separate entities at an application for one entity while using a single token. This problem often arises because tokens are conventionally generated for authorizing transactions with one particular entity, and not others.

In many cases, this lack of capability leads to failed electronic transactions, especially in cases of multiple electronic transactions occurring in a single session, which can strain system resources associated with error mediation. Moreover, in many cases, failed electronic transactions can lead to excessive recurrences of requests for new tokens, requiring further computational resources, especially considering that newly generated tokens must often be unique with respect to previously generated tokens. And newly generated tokens may still be invalid for authorizing multiple electronic transactions made at a single application, leading to additional failed electronic transactions, which use up processing and storage resources of token generation systems as well as systems of merchants or other entities attempting to fulfill an electronic transaction with a token. In some instances, excessive amounts of electronic transaction attempts using a token invalid for authorizing the electronic transactions desired can cause applications or systems to have reduced response times for responding to other operations, or, in some cases, even crash.

In view of these deficiencies of conventional authorization systems, there is a need for improved systems and methods for authorizing requests using tokens. The disclosed system and methods address one or more of the problems set forth above and/or other problems in the prior art.

SUMMARY

Consistent with the present embodiments, one aspect of the present disclosure is directed to a system for authorizing proxy number token requests. The system may comprise a network interface; at least one processor; and at least one memory unit storing instructions that, when executed by the at least one processor, cause the at least one processor to perform operations. The operations may comprise receiving a first request to use a proxy number token to complete a first action associated with a first entity; authorizing the first request; receiving a second request to use the proxy number token to complete a second action associated with a second entity; determining a modifiable relationship data binding associated with the first and second entities, the modifiable relationship data binding comprising multiple parameters; determining that the second request satisfies the parameters; and authorizing the second request based on a determination that the second request satisfies the parameters.

In accordance with further embodiments, receiving the first request may comprise receiving the first request from a remote user device; and the operations may further comprise: generating the proxy number token in response to receiving the first request; and transmitting the proxy number token to the remote user device.

In accordance with further embodiments, generating the proxy number token comprises generating a proxy number token that is based on a client device.

In accordance with further embodiments, the operations may further comprise: detecting a use of the proxy number token, the use being based on the authorizing of the first request; and in response to the detecting, binding the proxy number token to a first entity identifier.

In accordance with further embodiments, the parameters may comprise at least one of: a first category of the first entity, a second category of the second entity, the proxy number token, a time, a device identifier, an account identifier, or a user identifier.

In accordance with further embodiments, the modifiable relationship data binding may comprise a modifiable relationship data binding linking the first category of the first entity to the second category of the second entity.

In accordance with further embodiments, at least one of the first or second category may be associated with a third entity.

In accordance with further embodiments, at least one of the first or second category may be represented by a merchant category code (MCC).

In accordance with further embodiments, generating the proxy number token may comprise configuring a proxy number token to be valid for authorization of an electronic transaction for only the first entity.

In accordance with further embodiments, the proxy number token may be generated based on at least two of: a user identifier, an account identifier, a first entity identifier, a time, a session identifier, or a device identifier.

In accordance with further embodiments, generating the proxy number token may comprise generating a proxy number token according to a hashing algorithm.

In accordance with further embodiments, determining the modifiable relationship data binding may comprise determining a modifiable relationship data binding created in response to an association between the first and second entities.

In accordance with further embodiments, the operations may further comprise determining the association between the first and second entities in response to a cluster generated by a machine-learning model.

In accordance with further embodiments, the cluster may comprise a cluster of previous actions, the cluster of previous actions being: associated with the first and second entities; and initiated by a plurality of user devices.

In accordance with further embodiments, completing the first action may comprise transmitting a first electronic signal to a first remote device; and completing the second action may comprise transmitting a second electronic signal to a second remote device.

In accordance with further embodiments, the first electronic signal may comprise a first authorization to transfer funds from a third entity to the first entity; and the second electronic signal may comprise a second authorization to transfer funds from the third entity to the second entity.

Consistent with the present embodiments, a second aspect of the present disclosure is directed to a method for authorizing proxy number token requests. The method may comprise receiving a first request to use a proxy number token to complete a first action associated with a first entity; generating the proxy number token in response to receiving the first request; transmitting the proxy number token to a remote user device; authorizing the first request in response to receiving the proxy number token as part of a transaction authorization request associated with the first entity; creating a relationship data binding between the proxy number token and the first entity, the relationship data binding limiting use of the proxy number token to transactions associated with the first entity; receiving a second transaction authorization request associated with a second entity, the second transaction request including the proxy number token; in response to determining that the second entity is different from the first entity, determining a modifiable relationship data binding associated with the first and second entities, the modifiable relationship data binding comprising multiple parameters and having been created based on a model-determined cluster of declined token-based electronic transactions; determining that the second request satisfies at least one of the multiple parameters; and authorizing the second request based on a determination that the second request satisfies at least one of the multiple parameters.

Consistent with other disclosed embodiments, an exemplary embodiment may include a non-transitory computer-readable storage medium storing instructions, which may be executed by at least one processor device and perform any of the methods described herein.

The foregoing general description and the following detailed description provide exemplary embodiments and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The disclosure is generally directed to automated systems and processes for coordinating the analysis, transmission, and management of test datasets.

Reference will now be made in detail to exemplary embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
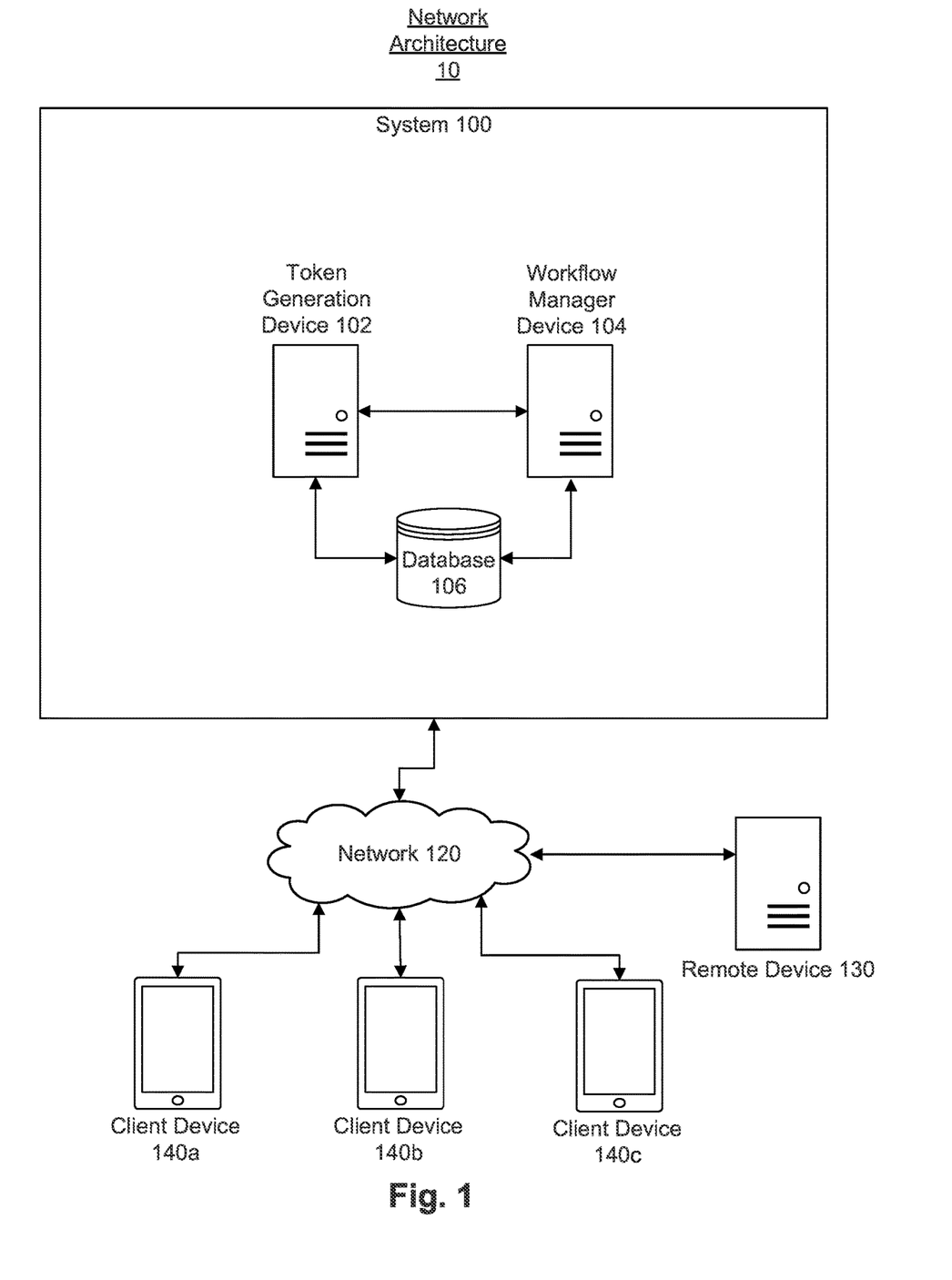
FIG. 1 is an exemplary pictographic representation of a network architecture, consistent with disclosed embodiments.

FIG. 1 is an exemplary pictographic representation of network architecture 10, which may include a system 100. System 100 may include computing devices configured to carry out processes discussed herein. In some embodiments, system 100 may be associated with a software developer, company, financial service provider (FSP) and/or other entity involved with facilitating authorization of transactions using tokens. In some embodiments, system 100 may include multiple computing devices communicably connected to each other within a local network (e.g., through a network interface). For example, system 100 may include a token generation device 102, which may generate tokens for use as proxy tokens for a particular user, device, account, etc. In some embodiments, token generation device 102 may generate a token according to a particular algorithm (e.g., hash function), to ensure uniqueness of a token with respect to other tokens, which may ensure secure and reliable authorization of an operation (e.g., carrying out an electronic transaction) using a token.

System 100 may also include a workflow manager device 104, which may generate and/or maintain data bindings or other electronic mechanisms for configuring and/or managing tokens and/or token uses. For example, workflow manager device 104 may create a data binding allowing a token generated for a single merchant entity or a single transaction to be used for multiple transactions, according to particular criteria. In some embodiments, workflow manager device 104 may create a data binding using user-defined mappings (e.g., mappings between one or more merchants, transactions, devices, times, and/or locations). By applying data bindings in combination with authorization techniques using tokens, additional authorizations may be achieved for what otherwise may be a single-use token or a single-merchant-bound token. For example, a data binding may bind a particular token to various combinations of electronic transaction parameters, such as a merchant identifier so that transactions made with a particular token may only be authorized if the merchant identifier associated with the transaction matches a merchant identifier bound to the token.

System 100 may include a database 106, which may store and/or organize data, to carry out processes discussed herein. For example, database 106 may store information received from token generation device 102 or workflow manager device 104. As another example, database 106 may store tokens, data binding information (e.g., within an Extensible Markup Language (XML) file), and/or log data related to operations performed by a client device, a remote device 130, etc.

Network architecture 10 may also include a network 120, which devices (e.g., token generation device 102 and a client device 140c) may use to connect to each other (e.g., to send and/or receive communications). Network 120 may be one or more public or private networks and may include, for example, one or more wired or wireless networks, including, without limitation, a Local Area Network (LAN), a Wide Area Network (WAN), a Metropolitan Area Network, an Institute of Electrical and Electronics Engineers (IEEE) 802.11 wireless network (e.g., "Wi-Fi"), a network of networks (e.g., the Internet), a land-line telephone network, or the like. Network 120 may be connected to other networks (not depicted in FIG. 1) to connect the various system components to each other and/or to external systems or devices. In some embodiments, network 120 may be a secure network and require a password to access the network.

Figure 2:
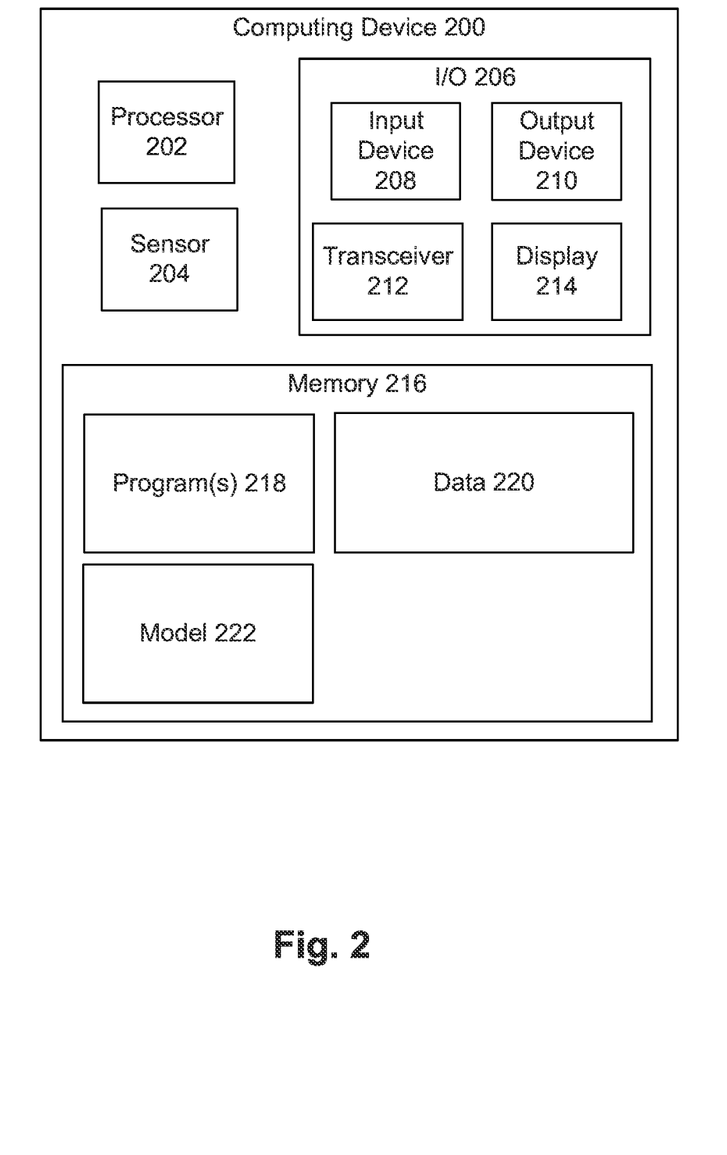
FIG. 2 is an exemplary pictographic representation of a computing device, consistent with disclosed embodiments.

Network architecture 10 may also include remote device 130, which may be an instance of a computing device 200 (e.g., a server), discussed further with respect to FIG. 2. In some embodiments, remote device 130 may receive an electronic transaction request, which may include a token, from a client device. In some embodiments, remote device 130 may be a point-of-sale (POS) device, which may be equipped to receive communications from a client device, such as via radio communications, near-field connectivity (NFC) communications, Wi-Fi, or other wireless communication channel. In some embodiments, remote device 130 may be associated with a particular merchant, hospital, parking facility management group, etc. In some embodiments, remote device 130 may transmit information to a client device, such as data causing the client device to display a user interface, display a notification, change a user interface, output a sound, power a vibration motor, access information, transmit information, etc.

Network architecture 10 may also include client devices, such as client devices 140a, 140b, and 140c. A client device may be an instance of a user device 300, described with respect to FIG. 3. In some embodiments, a client device may be a smartphone, smartwatch, personal computer, laptop, or other computing device associated with a user. In some embodiments, a client device may have a unique identifier, which may be accessible only to particular applications (e.g., a user account identifier associated with a program or application for using tokens), or may be accessible to a non-exclusive list of applications (e.g., a Media Access Control (MAC) address, Internet Protocol (IP) address, serial number, etc.).

FIG. 2 is an exemplary pictographic representation of a computing device 200. In some embodiments, other devices (e.g., devices of system 100), such as token generation device 102 and/or workflow manager device 104 may include any or all of the aspects of computing device 200. Computing device 200 may include a processor 202, which may include one or more dedicated processing units, application-specific integrated circuits (ASICs), field-programmable gate arrays (FPGAs), graphical processing units, or various other types of processors or processing units coupled with a memory 216. Processor 202 may constitute a single-core or multiple-core processor that executes parallel processes simultaneously. For example, processor 202 may be a single-core processor configured with virtual processing technologies. In some embodiments, processor 202 may use logical processors to simultaneously execute and control multiple processes. Processor 202 may implement virtual machine technologies, or other known technologies to provide the ability to execute, control, run, manipulate, store, etc., multiple software processes, applications, programs, etc. In another embodiment, processor 202 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 202 may execute various instructions stored in memory 216 to perform various functions of the disclosed embodiments described in greater detail below. Processor 202 may be configured to execute functions written in one or more known programming languages. In some embodiments, computing device 200 may implement at least one service, such as a service for routing device communications, a service for generating tokens, and/or a service for authenticating tokens.

Computing device 200 may also include a sensor 204, such as a location sensor, touch sensor, accelerometer, or the like. Computing device 200 may also include an I/O 206, which may include at least one of a display 214 (e.g., graphical display, textual display, LED display, LCD display, etc.), an LED, a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, a transceiver (e.g., a transceiver 212, which may receive and/or transmit data to and/or from a client device across a wireless communication channel), an input device (e.g., an input device 208), an output device (e.g., output device 210), or other I/O device to perform methods of the disclosed embodiments. I/O 206 may include components of an interface (e.g., a user interface). I/O 206 may also include a network interface (not shown), which may include at least one of a wired or wireless network card/chip set. For example, input device 208 may include a touch sensor, a mouse, a keyboard, or any device configured to allow for user input to computing device 200. As another example, output device 210 may include a speaker, display, haptic feedback device, or other device configured to provide output from computing device 200 to a user. Transceiver 212 may include a pluggable and/or optical transmission transceiver.

Computing device 200 may also include memory 216, which may be a single memory component, or multiple memory components. Such memory components may include an electronic storage device, a magnetic storage device, an optical storage device, an electromagnetic storage device, a semiconductor storage device, or any suitable combination of the foregoing. For example, memory 216 may include any number of hard disks, random access memories (RAMs), read-only memories (ROMs), erasable programmable read-only memories (EPROMs or Flash memories), and the like. Memory 216 may include one or more storage devices configured to store instructions usable by processor 202 to perform functions related to the disclosed embodiments. Memory 216 may also include any number of programs, applications, application program interfaces (APIs), or any other data, consistent with the disclosed embodiments.

In some embodiments, memory 216 may store program(s) 218, which may include one or more programs (e.g., APIs, processes, modules, code, scripts, or functions) used to perform methods consistent with disclosed embodiments. For example, program(s) 218 may include a token manager client 190, which may, for example, track uses of tokens, format tokens, decrypt tokens, encrypt tokens, etc. Program(s) 218 may also include a listener, which may listen for token-related data and/or data from a specific device. Programs 158 may be written in one or more programming or scripting languages.

Memory 216 may also maintain data 220, which may include data associated with a user account, an application, a particular device, a model, a communication, or any other data related to tokens. Data may be exchanged between devices, such as between devices within system 100, between a remote device 130 and system 100, between a remote device 130 and a client device, etc. Such data may be exchanged in accordance with various formats or protocols, including XML, REST, SOAP, JSON, GraphQL, and the like. In some embodiments, data exchange may involve translating between formats or protocols and/or encrypting or decrypting data (e.g., encrypting or decrypting a token to use for completing an electronic transaction).

Memory 216 may also include a computerized model 222, which may be an artificial intelligence (AI) model for authorizing proxy number token requests, consistent with disclosed embodiments. Model 222 may be, without limitation, any one of a computer software module, an algorithm, a machine-learning model, a data model, a statistical model, a recursive model, an exponential model, an autoencoder model, a recurrent neural network (RNN) model, a long-short term memory (LSTM) model, or another neural network model, consistent with disclosed embodiments. In some embodiments, model 222 may be a model in a learning stage or may have been trained to a degree (e.g., by a developer, a machine, or a combination of both). In some embodiments, a developer may interact with model 222 to approve or disapprove of suggested changes to model 222 or parameters of model 222 (e.g., suggested by a machine). After this interaction, model 222 may be updated to reflect the user interactions and/or machine inputs. Such updates may occur iteratively, such as periodically, in response to a combination of user inputs and/or machine inputs, etc. For example, model 222 may be configured to predict a data binding configured to prevent a particular electronic transaction error, which a user may approve or disapprove. Based on such an approval or disapproval, model 222 may be altered, and may generate different predictions as a result.

Figure 3:
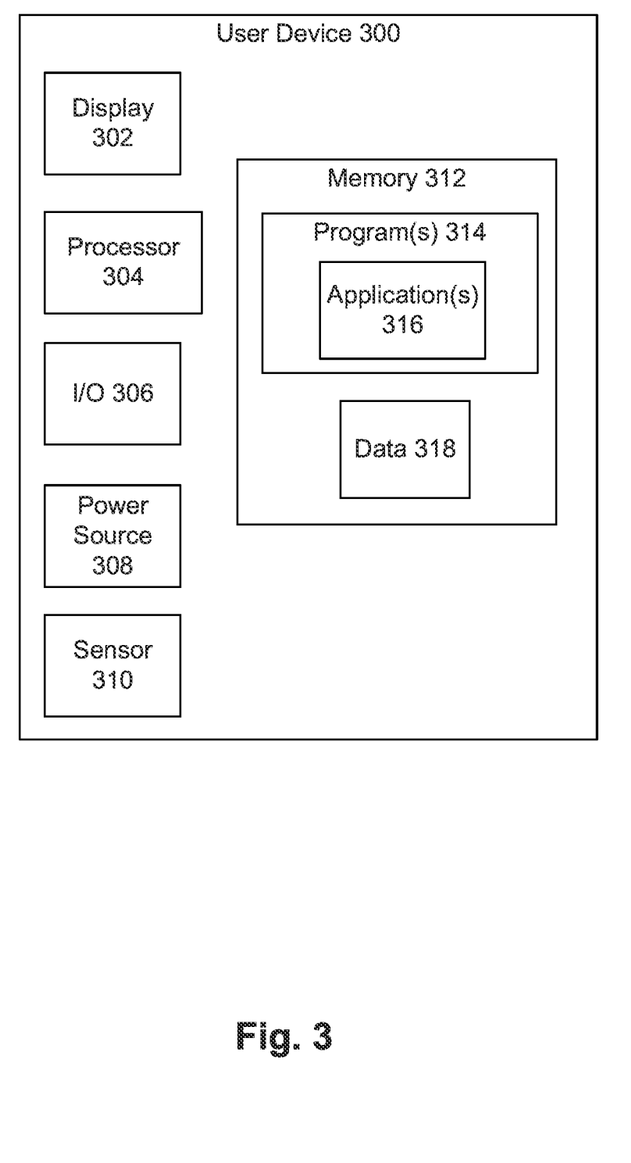
FIG. 3 is an exemplary pictographic representation of a user device, consistent with disclosed embodiments.

FIG. 3 is an exemplary pictographic representation of a user device 300, which may carry out processes discussed herein. In some embodiments, user device 300 may be a client device (e.g., client device 140a). User device 300 may include a display 302, which may be a touchscreen, a graphical display, a textual display, a light-emitting diode (LED) display (e.g., an organic light-emitting diode, or OLED, display), a liquid crystal display (LCD) display, and/or a flexible display. User device 300 may include a processor 304, which may include any or all of the aspects of processor 202, consistent with disclosed embodiments. In some embodiments, user device 300 may also include input/output devices (I/O) 306, which may include an input device or output device, such as those discussed with respect to computing device 200 (e.g., a touchscreen, a display, etc.). User device 300 may also include a power source 308, such as a battery (e.g., a lithium ion battery). In some embodiments, user device 300 may also receive power from a remote source, such as via a wired connection or a wireless inductive connection (e.g., receiving power according to the Qi standard). User device 300 may also include a sensor 310, such as an accelerometer, a light sensor, an audio sensor, an infrared sensor, a motion sensor, a piezoelectric sensor, a laser sensor, a sonar sensor, a global positioning system (GPS) sensor, an electromagnetic sensor, and the like.

User device 300 may also include a memory 312, which may include any or all of the aspects of memory 216, and which may store instructions usable by processor 202 to perform functions related to the disclosed embodiments. For example, memory 312 may include operation code (e.g., operating system code, application operation code, etc.) according to which an application (e.g., application(s) 316) may run on user device 300. In some embodiments, operation code may be updated using an application store. As another example, memory 312 may store program(s) 314, which may have any or all of the aspects of program(s) 218, consistent with disclosed embodiments. For example, programs 314 may include an application configured to display user interfaces using testing data. Memory 312 may also include data 318, which may include a log, user input data, a token (e.g., a proxy number token), a token decryption key, or any other data for use in the processes described herein. In some embodiments, data 318 may include data tracked at user device 300 (e.g., by a program 314). For example, an application 316 may track actions taken at user device 300 and/or related information (a token used, a token generated, a mouse click, a button press, a touchscreen interaction, an electronic transaction initiated, a device communicated with, a purchase made, a webpage viewed, a download, a time an action was taken, etc.). By way of further example, a program 314 may track (e.g., using a browser extension, cookie, or the like) a user action taken in an Internet browser to view and/or interact with a user interface layer, and may store data containing details of views and/or interactions in data 318.

Figure 4:
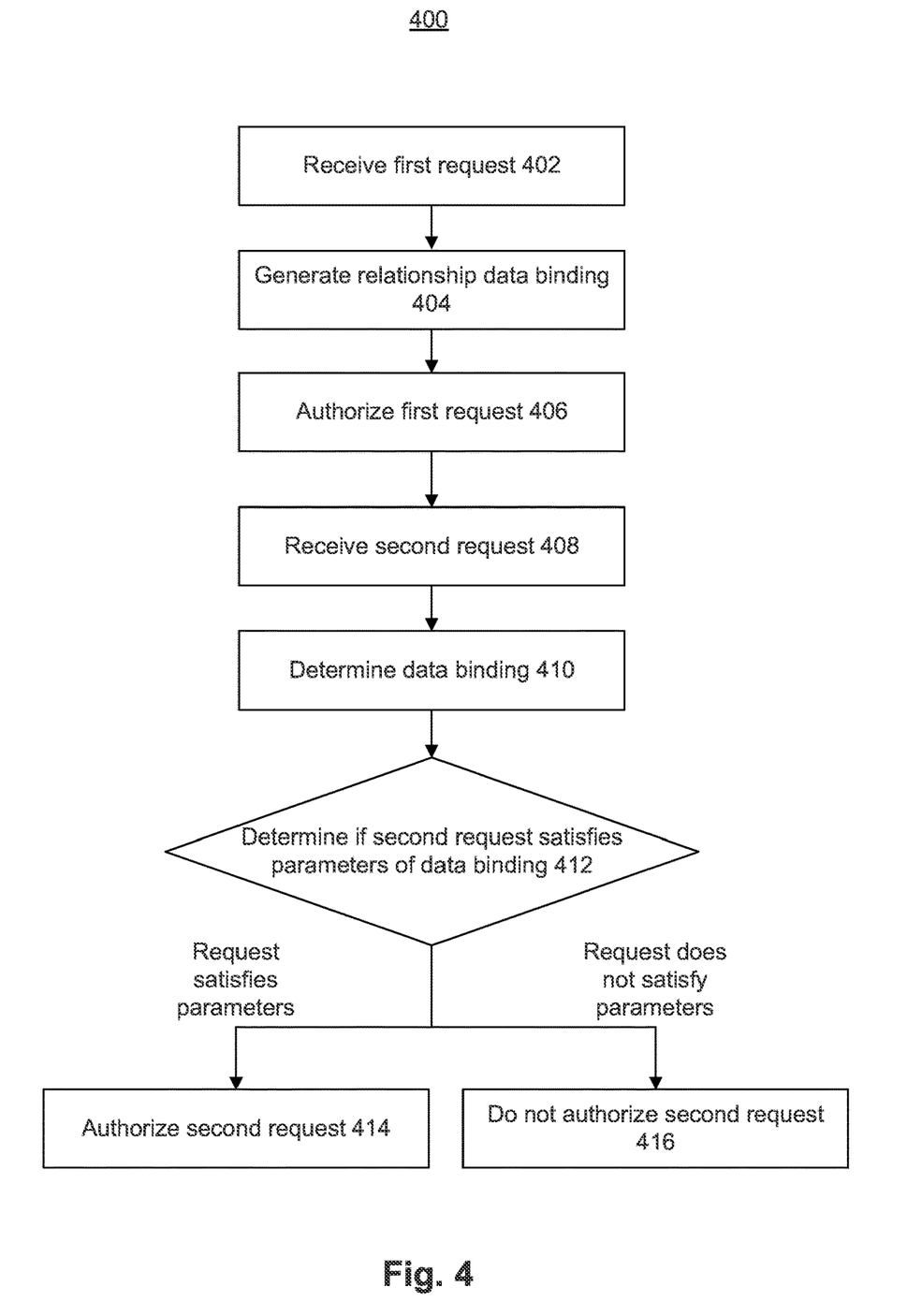
FIG. 4 is an exemplary pictographic representation of a process for authorizing proxy number token requests, consistent with disclosed embodiments.

FIG. 4 is an exemplary pictographic representation of a process 400 for authorizing proxy number token requests, which may illustrate a method for authorizing proxy number token requests, consistent with disclosed embodiments. For example, process 400 may be performed entirely or in part by at least one computing device 200 (e.g., using processor 202), such as token generation device 102 and/or workflow manager device 104. Alternatively or additionally, some steps of process 400 may be performed by user device 300 (e.g., a client device 140b) and other steps may be performed by another device, such as remote device 130. While process 400 is described with respect to computing device 200, one of skill in the art will understand that the steps illustrated in FIG. 4 are exemplary and steps may be added, merged, divided, duplicated, repeated, modified, and/or deleted in some embodiments. As can be appreciated by the description below, process 400 may allow for customizable extensibility of a data binding to allow for flexible use of a token, while still maintaining security achieved with an initial binding (e.g., generated to be valid for only a single merchant).

At step 402, computing device 200 may receive a first request, which may be a request to use a proxy number token to complete a first action (e.g., an electronic transaction, an authorization confirmation) associated with a first entity (e.g., merchant, medical service provider, parking facility management group, etc.). In some embodiments, a first request may be received from a client device (e.g., client device 140b) and may identify a user, session (e.g., website session), and/or device associated with the request. In some embodiments, a request may include an instruction to generate a token. For example, a request may prompt computing device 200 to generate, for a client device, a proxy number token associated with a first entity concurrently (or substantially concurrently) with the client device attempting an electronic transaction with the first entity (e.g., at step 402), which may be deemed an "at-authorization proxy number token." Additionally or alternatively, computing device 200 may generate, for a client device, a proxy number token associated with a first entity prior to the client device attempting an electronic transaction with the first entity (e.g., prior to step 402), which may be deemed a "pre-authorization proxy number token." A token may be a security token, such as a cryptographic token, a static token, a synchronous dynamic token (e.g., generated using synchronized clocks), an asynchronous token (e.g., generated using an unsynchronized clock), and/or any other kind of token for authenticating an electronic transaction. In some embodiments, a token may be a proxy number token in that it may represent a code (e.g., sequence of characters) that may stand in for another number (e.g., an account number), which may increase the security of an electronic transaction, which may involve multiple communications sent between multiple devices across a network, which may be associated with risks of interception, manipulation, and fraud.

In some embodiments, computing device 200 may generate a proxy number token in response to receiving the first request. Generating a proxy number token may involve computing a proxy number (e.g., a virtual number that is a proxy for an account number), such as by applying a combination of inputs (e.g., account number, device identifier, a time, seller name, data binding, etc.) to a hashing algorithm (e.g., SHA3-512, BLAKE2, BLAKE3, etc.), encryption algorithm, and/or other algorithm programmed or programmable to produce a proxy number for a proxy number token.

In some embodiments, a proxy number token may be generated to be unique to the first entity (e.g., configured to only be valid for authorizing an electronic transaction with the first entity). For example, generating the proxy number token may comprise configuring the proxy number token to be valid for authorization of an electronic transaction (e.g., valid for a device or system to use to authorize an electronic transaction) for only a first entity (e.g., seller, merchant device, etc.) and not a second entity. By way of further example, computing device 200 may create a relationship data binding between a proxy number token and a first entity, and the relationship data binding may limit use of the proxy number token to transactions associated with the first entity. In some embodiments, a proxy number may expire after an amount of time. For example, a timer may be encoded into a proxy number and cause the proxy number to be invalid (e.g., unusable for a transaction) after an amount of time. In some embodiments, the proxy number token may be a universally unique identifier (UUID). In some embodiments, proxy number token is generated based on a user identifier, an account identifier, a first entity identifier, a time, a session identifier, and/or a device identifier. Computing device 200 may also transmit the proxy number token (e.g., after generation) to a remote user device (e.g., a client device 140b). In some embodiments, a proxy number token may be generated based on a client device input (e.g., a selection made at a client device). For example, a user may select an option within a graphical user interface (GUI) at a user device to use proxy numbers for some or all electronic transactions initiated by the user device, by a particular application, for a particular merchant, for a particular amount of time, and/or for a particular type of transaction (e.g., a transaction over a threshold purchase amount, a transaction within a particular category). In some embodiments, a request may be a request to complete an electronic transaction using a proxy number token, and the request may include at least one token (e.g., a proxy number token). In some embodiments, computing device 200 may generate a proxy number token when a client device with an active browser extension (e.g., an extension for electronic transactions) accesses a website and/or initiates an electronic transaction at the website.

At step 404, computing device 200 may generate (e.g., generate according to a user and/or machine input, receive from another device, retrieve from a storage device, otherwise access, etc.) a relationship data binding, which may be associated with a code (e.g., a merchant category code, abbreviated as an MCC), a category (e.g., custom category defined by an FSP), a token, an electronic transaction, an electronic transaction time, a time window, and/or a particular device. For example, a data binding may include a relationship between an approved (e.g., token-based) electronic transaction completed for a first MCC and an unapproved electronic transaction for a second MCC. As yet another example, data binding may include a relationship between a proxy number token and an unapproved electronic transaction for a second MCC. In some embodiments, a data binding may be based on a relationship generated by a user, a machine learning model, or a combination of both. A data binding may be a table, a set of linked fields, or other data structure configured to establish a relationship (dependent, interdependent, etc.) or rule (e.g., logic) between at least two data elements. A data binding may be configured using XML, HTML, an API language, or other computing language. A data binding may synchronize particular data, such as synchronizing one use of a token (e.g., for a first MCC, by a particular client device, etc.) to another use of a token (e.g., for a second MCC, during a particular time window, etc.). In some embodiments, computing device 200 may receive a modification to a data binding (e.g., from a user device), and may modify the binding according to the received modification. In some embodiments, computing device 200 may store a data binding and/or modified data binding (e.g., within database 106), which may be subsequently used in the possible authorization of a request (e.g., at step 412) such that the data binding is separate from a proxy number token. Additionally or alternatively, a data binding may be integrated into a proxy number token such that extensible authorization parameters can be easily transmitted and received with a token that may also be configured to authorize an initial transaction, without congesting access to a database storing a corresponding data binding. In this manner, a proxy number token may initially be configured for use with a single entity, but through an extensible data binding, may be usable with other entities.

In some embodiments, the modifiable relationship data binding may include multiple parameters (e.g., data elements, data element associations, data element synchronizations, etc.). For example, a data binding may include parameters of a first category of the first entity (e.g., an MCC, custom category, etc.), a second category of the second entity, the proxy number token, a time (e.g., a time an electronic transaction was initiated, a time an electronic transaction was completed, etc.), a time window (e.g., an amount of time within an electronic transaction completion) a device identifier, an account identifier, and/or a user identifier. In some embodiments, a modifiable relationship data binding may have been created based on a model-determined cluster of declined token-based electronic transactions (e.g., as described further below). In some embodiments, a modifiable relationship data binding may link a first category of a first entity (e.g., an MCC of a first merchant) to a second category of a second entity (e.g., an MCC of a second merchant). For example, the first or second category may be represented by an MCC. In some embodiments, the first or second category may be associated with a third entity. For example, an MCC may be associated with numerous entities selling products (e.g., services) related to hospitality.

In some embodiments, the data binding may reflect a modifiable relationship, which may be created, altered, and/or removed by a computing device (e.g., workflow manager device 104). In some embodiments, a modifiable relationship data binding may have been created in response to an association between the first and second entities. For example, an association (e.g., modifiable relationship) may be created at a device and a data binding that binds data elements associated with the association may be automatically generated, to allow for rapid integration with contemporaneous uses of tokens and/or initiations of electronic transactions, thousands of which may occur in seconds and could benefit from a relevant data binding.

In some embodiments, an association between a first and second entity may be determined in response to a cluster generated by a machine-learning model, which may be a computer software module, an algorithm, a data model, a statistical model, a recursive model, an exponential model, an autoencoder model, a recurrent neural network (RNN) model, a long-short term memory (LSTM) model, or another neural network model. For example, a machine learning model may generate a cluster of previous actions that are associated with particular (e.g., first and second) entities and/or initiated by a plurality of user devices (e.g., client devices 140*a*, 140*b*, 140*c*, etc.). In some embodiments, a machine learning model may determine an error pattern by correlating a number of errors (e.g., errors associated with failed electronic transactions) with any combination of entities, token use, electronic transaction timing, user account, location, type of product attempted to be purchased, an electronic transaction amount, etc. For example, a machine learning model may correlate errors occurring with a merchant and an MCC with earlier transactions (e.g., within a timeframe threshold) using a different merchant but the same MCC. In some embodiments, a machine-learning model may predict a recommendation based on a correlation. For example, a machine learning model may predict that creating a particular data binding, such as a data binding between two MCCs, may reduce a number of errors while still authorizing appropriate actions (e.g., electronic transactions). In some embodiments, a machine learning model may predict a recommendation when a number of similar errors (e.g., errors with a same combination of merchants, MCCs, timeframes, and/or devices) reaches a certain threshold (e.g., threshold transaction amount associated with errors, a threshold number of similar errors, a threshold percentage of similar errors among a larger group of errors, etc.). Such a threshold may be a number of errors, a transaction amount associated with the errors, an error rate relative to a combination of transaction parameters (combination of any number of merchants, MCCs, times, locations, devices, etc.). In some embodiments, a machine learning model may generate parameters for a data binding based on transaction parameters associated with the errors. For example and without limitation, if a set of errors is associated with a combination of (i) a first transaction having parameters of a first merchant and an MCC and, within a timeframe, (ii) a second transaction having parameters of a second merchant and the MCC, the machine learning model may generate a data binding having parameters associated with the first merchant, the second merchant, the MCC, and the timeframe.

At step 406, computing device 200 may authorize a first request (e.g., a request received at step 402). In some embodiments, authorizing a request may involve confirming whether a token is genuine and/or valid for use with a particular electronic transaction. Authorizing a request may also involve performing actions associated with completing an electronic transaction, such as transmitting a prompt to one device to transfer electronic funds to another device (e.g., associated with an entity, such as a merchant), updating a GUI on a user device; updating financial data stored at a database, etc. In some embodiments, authorizing a request may involve detecting a use of a proxy number token. For example, a user device may store and attempt to use a proxy number token to complete an electronic transaction. In response to such detection, computing device 200 may bind the proxy number token to a first entity identifier (e.g., an identifier associated with a merchant connected with the electronic transaction). In some embodiments, after such a data binding is created, the proxy number token may be configured for use only with a particular entity (e.g., merchant, medical service provider, parking facility management group, etc.) and/or a particular electronic transaction (e.g., for a product purchased at a certain time). For example, computing device 200 may restrict usage of a proxy number token to electronic transactions having a certain combination of parameters (e.g., a particular combination of a transaction name, transaction amount, MCC, postal code, state, zip code, other geographic identifier, and/or other data attribute of an electronic transaction). In some embodiments, a particular entity (e.g., merchant) may be mapped to a transaction authorization using an exact and/or regex match for parameters within a combination. By way of example and not limitation, computing device 200 may map electronic transaction information having exact parameters of "name=WMRT 101" and "postcode=02067" to an entity identifier of "Wal-Mart." As another example, computing device 200 may map electronic transaction information having fuzzy parameters (e.g., allowing for an amount of variation) such as "site=walmart.com" and "MCC=6000" to an entity identifier of "Wal-Mart."

At step 408, computing device 200 may receive a second request, which may be a request to use a proxy number token to complete a second action (e.g., an electronic transaction, an authorization confirmation) associated with a second entity (e.g., merchant, medical service provider, parking facility management group, etc.). In some embodiments, a second request may be received from a client device (e.g., client device 140*b*) and may identify a user, session, and/or device associated with the request. In some embodiments, the second action may be associated with a first action. For example, a second electronic transaction may be initiated according to inputs to a user interface into which inputs for a first electronic transaction were also entered. To further this example, without limitation, a user may input into a user interface both information to purchase a flight ticket (e.g., a first electronic transaction with a first entity) and information to purchase travel insurance (e.g., a second electronic transaction with a second entity). As a further example, the first and second electronic transactions may be associated with a same application or website browsing session. Of course, in some embodiments, any number of electronic transactions and/or entities may be associated with each other (e.g., initiated using the same user interface). The second request may include any or all of the aspects of the first request described with respect to step 402.

At step 410, computing device 200 may determine (e.g., access or generate) a data binding, which may be a modifiable relationship data binding associated with a first and second entity (e.g., a first merchant associated with a flight product and a second merchant associated with a travel insurance product or Wi-Fi service). In some embodiments, computing device 200 may determine a data binding only if the second request is associated with a transaction parameter (e.g., merchant identifier) different from an expected transaction parameter, which may be a transaction parameter (e.g., merchant identifier) of a first request (e.g., a request received at step 402). For example, computing device 200 may determine a modifiable relationship data binding in response to determining that the second entity is different from the first entity. This may reduce processing load and/or database access congestion while still maintaining security of electronic transactions. In some embodiments, computing device 200 may determine a modifiable relationship data binding by retrieving it from a storage device (e.g., database 106) or local memory. Additionally or alternatively, computing device 200 may extract a relationship data bind from a proxy number token, which may have been received at step 408.

At step 412, computing device 200 may determine if a request (e.g., a second request) satisfies authorization parameters, which may be represented by a data binding (e.g., as described above). If computing device 200 determines that the request does satisfy the authorization parameters, it may proceed to step 414. For example, a first transaction parameter combination of a first merchant identifier and an MCC may be bound to a second transaction parameter combination of a second merchant identifier and the MCC. Continuing this example, if the request at step 412 includes a transaction parameter combination of a second merchant identifier and the MCC, and a source of the request is associated with an earlier transaction parameter combination of a first merchant identifier and the MCC, computing device may proceed to step 414. If computing device 200 determines that the request does not satisfy the authorization parameters, it may proceed to step 416. For example, if the request at step 412 includes an unknown merchant identifier, or if the request includes a transaction parameter combination of a third merchant identifier and an MCC, where the authorization parameters are represented by a data binding between a first merchant identifier, a second merchant identifier, and an MCC, the request may not satisfy the authorization parameters.

At step 414, computing device 200 may authorize a second request, which may be based on determining that the second request satisfies particular parameters (e.g., determined at step 412). Authorizing a request may include completing a first action (e.g., electronic transaction), which may comprise transmitting a first electronic signal to a first remote device (e.g., remote device 130, which may be associated with an entity such as a merchant, medical service provider, parking facility management group, etc.) and completing the second action comprises transmitting a second electronic signal to a second remote device (e.g., another remote device 130, which may be associated with an entity). For example, a first electronic signal may include a first authorization to transfer funds from a third entity (e.g., an FSP) to the first entity and the second electronic signal may comprise a second authorization to transfer funds from the third entity to the second entity. In some embodiments, a second request may be authorized despite the second request being associated with a token that was configured to be valid for a device or system for use in authorizing only a first action. In this manner, genuine requests may be authorized without requiring computational resources to generate an additional token, while not rejecting a valid request, whose initiation may be tethered to that of another request (e.g., a user interface may only permit a user device to initiate a transaction for a flight ticket and travel insurance within the same user interface), thus reducing strain on system resources while maintaining seamless request responses to users. In some embodiments, a token may be deactivated at a particular point, such that it may not be useable for additional electronic transactions, despite a data binding that may otherwise allow it to do so. For example, a token may be removed from a user device, a token may be reconfigured, a data binding may be updated, and/or a data binding may be added, to disable the token from further use.

At step 416, computing device 200 may not authorize the second request. In some embodiments, computing device 200 may not authorize the second request based on parameters of a data binding not being satisfied. Additionally or alternatively, a second request may satisfy a data binding set of parameters for rejecting a request. For example, a second request may relate to a second MCC different from a first MCC of a first request, where the data binding specifically denies cross-approval between the first and second MCCs. In some embodiments, not authorizing the second request may comprise preventing a user device and/or seller device from completing an electronic transaction using a particular token. In some embodiments, computing device 200 may transmit a notification to a display (e.g., a display of computing device 200) and/or a remote device (e.g., a client device), which may include information related to the prevented electronic transaction (e.g., a transaction identification number, an account number, transaction time, transaction amount, product identifier, user identifier, seller identifier, FSP identifier, device identifier, etc.). In some embodiments, information related to the prevented electronic transaction may be transmitted to a machine-learning model, which may use the information, possibly together with other inputs, to alter its parameters to improve identification of clusters of errors (as described above).

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static remote access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as constituting transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer programs based on the written description and methods of this specification are within the skill of a software developer. The various functions, scripts, programs, or modules can be created using a variety of programming techniques. For example, computer-readable program instructions for carrying out operations of the present disclosure may be assembler instructions, instruction-set-architecture (ISA) instructions, machine instructions, machine-dependent instructions, microcode, firmware instructions, state-setting data, or either source code or object code written in any combination of one or more programming languages (including an object oriented programming language and/or conventional procedural programming language) such as Smalltalk, C++, JAVASCRIPT, C, C++, JAVA, PHP, PYTHON, RUBY, PERL, BASH, or other programming or scripting languages. One or more of such software sections or modules can be integrated into a computer system, a non-transitory computer-readable medium, or existing communications software. The programs, modules, or code can also be implemented or replicated as firmware or circuit logic. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer-readable program instructions may be provided to a processor of a general purpose computer, special purpose computer, or other programmable data processing apparatus, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively for any number of iterations, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Moreover, while exemplary embodiments have been described herein, these have been presented for purposes of illustration, but are not intended to be exhaustive or limited to the embodiments disclosed, such that the scope includes any and all embodiments having equivalent elements, modifications, variations, omissions, combinations (e.g., of aspects across various embodiments), adaptations or alterations, without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as examples only, with a true scope and spirit being indicated by the following claims and their full scope of equivalents.

What is claimed is:

1. A system, comprising:
   at least one memory unit storing instructions; and
   at least one processor configured to execute the instructions to:
   determine a proxy number token having a configuration comprising a first restriction to limit use of the proxy number token to transactions with a first merchant;
   in response to determining, via a machine learning model, a prevented transaction association between (i) the first merchant with which the proxy number token is configured for use and (ii) a second merchant with which the proxy number token is not configured for use, generate a modified configuration by modifying the configuration of the proxy number token such that the configuration of the proxy number token is modified to allow use of the proxy number token to a given transaction that is with the second merchant; and
   in response to receiving a request to use the proxy number token to complete a transaction with the second merchant, grant use of the proxy number token for the transaction with the second merchant based on (i) the modified configuration of the proxy number token and (ii) the transaction satisfying one or more parameters that are indicated by the modified configuration.

2. The system of claim 1, wherein the machine learning model is configured to:
   determine, based on the prevented transaction association, an error pattern by correlating a number of errors detected between (i) the first merchant with which the proxy number token is configured for use and (ii) the second merchant with which the proxy number token is not configured for use, wherein the modified configuration is generated to reduce the number of errors.

3. The system of claim 2, wherein the modified configuration is generated based on a determination that the number of errors detected between (i) the first merchant with which the proxy number token is configured for use and (ii) the second merchant with which the proxy number token is not configured for use is greater than or equal to a threshold number of errors.

4. The system of claim 1, wherein the at least one processor is further configured to:
   in response to receiving, from a remote user device, a prior request of a user to complete a prior transaction with the first merchant, generating the proxy number token, and transmitting the proxy number token to the remote user device.

5. The system of claim 1, wherein the configuration further comprises a relationship data binding comprises a mapping between the one or more parameters related to an earlier transaction with the first merchant and a given transaction with the second merchant.

6. The system of claim 1, wherein at least one of the one or more parameters is associated with a third merchant or a merchant category code (MCC).

7. The system of claim 1, wherein the at least one processor is further configured to:
   configure the proxy number token to be valid for authorization of an electronic transaction for only the first merchant.

8. The system of claim 7, wherein the at least one processor is further configured to:
   generate the proxy number token based on at least two of:
   a user identifier;
   an account identifier;
   a first merchant identifier;
   a time;
   a session identifier; or
   a device identifier.

9. The system of claim 1, wherein the at least one processor is further configured to:
   generate the proxy number token according to a hashing algorithm.

10. The system of claim 1, wherein the machine learning model is configured to generate a cluster of previous transactions (i) associated with the first merchant and the second merchant and (ii) initiated by a plurality of user devices, wherein the prevented transaction association between the first merchant and the second merchant is detected based on the cluster of previous transactions.

11. The system of claim 1, wherein the at least one processor is further configured to:
   receive a prior request to use the proxy number token to complete a prior transaction with the first merchant, wherein:
   completing the prior transaction comprises transmitting a first electronic signal to a first remote device; and
   completing the transaction comprises transmitting a second electronic signal to a second remote device.

12. The system of claim 11, wherein:
   the first electronic signal comprises a first authorization to transfer funds from a third merchant to the first merchant; and
   the second electronic signal comprises a second authorization to transfer funds from the third merchant to the second merchant.

13. A method implemented using one or more processors, the method comprising:
   determining a proxy number token having a configuration comprising a first restriction to limit use of the proxy number token to transactions with a first merchant;
   determining, via a machine learning model, a previously-undetected association between (i) the first merchant with which the proxy number token is configured for use and (ii) a second merchant with which the proxy number token is not configured for use;
   generating, based on the previously-undetected association, a modified configuration by modifying the configuration of the proxy number token such that the modified configuration of the proxy number token is modified to allow use of the proxy number token to a given transaction that is with the second merchant;
   receiving a request to use the proxy number token to complete a transaction with the second merchant; and
   granting, based on the request, use of the proxy number token for the transaction with the second merchant based on (i) the modified configuration of the proxy number token and (ii) the transaction satisfying one or more parameters that are indicated by the modified configuration.

14. The method of claim 13, wherein the machine learning model is configured to:
   determine, based on the previously-undetected association, an error pattern by correlating a number of errors detected between (i) the first merchant with which the proxy number token is configured for use and (ii) the second merchant with which the proxy number token is not configured for use, wherein the modified configuration is generated to reduce the number of errors.

15. The method of claim 14, wherein the modified configuration is generated based on a determination that the number of errors detected between (i) the first merchant with which the proxy number token is configured for use and (ii) the second merchant with which the proxy number token is not configured for use is greater than or equal to a threshold number of errors.

16. The method of claim 13, further comprising:
receiving, from a remote user device, a prior request of a user to complete a prior transaction with the first merchant;
generating, based on the prior request, the proxy number token; and
transmitting the proxy number token to the remote user device.

17. The method of claim 13, wherein the configuration further comprises a relationship data binding comprises a mapping between the one or more parameters related to an earlier transaction with the first merchant and a given transaction with the second merchant.

18. The method of claim 13, further comprising:
configuring the proxy number token to be valid for authorization of an electronic transaction for only the first merchant;
generating the proxy number token based on at least two of: a user identifier, an account identifier, a first merchant identifier, a time, a session identifier, or a device identifier; and
generating the proxy number token according to a hashing algorithm.

19. The method of claim 13, further comprising:
receiving a prior request to use the proxy number token to complete a prior transaction with the first merchant, wherein:
completing the prior transaction comprises transmitting a first electronic signal to a first remote device; and
completing the transaction comprises transmitting a second electronic signal to a second remote device.

20. One or more non-transitory computer-readable media storing computer program instructions that, when executed by one or more processors, effectuate operations comprising:
determining a proxy number token having a configuration comprising a first restriction to limit use of the proxy number token to transactions with a first merchant;
in response to determining, via a machine learning model, a previously-undetected association between (i) the first merchant with which the proxy number token is configured for use and (ii) a second merchant with which the proxy number token is not configured for use, generating a modified configuration by modifying the configuration of the proxy number token such that the configuration of the proxy number token is modified to allow use of the proxy number token to a given transaction that is with the second merchant; and
in response to receiving a request to use the proxy number token to complete a transaction with the second merchant, granting use of the proxy number token for the transaction with the second merchant based on (i) the modified configuration of the proxy number token and (ii) the transaction satisfying one or more parameters that are indicated by the modified configuration.

* * * * *